(12) United States Patent  (10) Patent No.: US 9,080,720 B2
Kahn                      (45) Date of Patent:     Jul. 14, 2015

(54) PAN/TILT TRACKING MOUNT

(75) Inventor: Philip Kahn, Burlingame, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 1429 days.

(21) Appl. No.: 11/697,636

(22) Filed: Apr. 6, 2007

(65) Prior Publication Data

US 2008/0278578 A1 Nov. 13, 2008

Related U.S. Application Data

(60) Provisional application No. 60/791,677, filed on Apr. 12, 2006.

(51) Int. Cl.
  H04N 7/18    (2006.01)
  F16M 11/18   (2006.01)
  F16M 11/10   (2006.01)
  F16M 11/12   (2006.01)
  F16M 11/20   (2006.01)

(52) U.S. Cl.
  CPC .............. *F16M 11/18* (2013.01); *F16M 11/10* (2013.01); *F16M 11/12* (2013.01); *F16M 11/2014* (2013.01); *H04N 7/183* (2013.01)

(58) Field of Classification Search
  USPC .................................................. 348/143, 151
  See application file for complete search history.

(56) References Cited

U.S. PATENT DOCUMENTS

| 3,559,937 | A |   | 2/1971  | Paine et al. |
| 4,473,840 | A | * | 9/1984  | Miyake ....................... 348/745 |
| 4,673,268 | A |   | 6/1987  | Wheeler et al. |
| 4,937,675 | A |   | 6/1990  | Starceski et al. |
| 5,224,675 | A | * | 7/1993  | Ellenberger et al. ........ 248/183.4 |
| 5,394,209 | A | * | 2/1995  | Stiepel et al. .................... 396/20 |
| 5,443,235 | A | * | 8/1995  | Bernhardt .................. 248/278.1 |
| 5,463,432 | A |   | 10/1995 | Kahn |
| 5,502,882 | A | * | 4/1996  | Duta et al. ................. 29/407.05 |
| 5,802,412 | A | * | 9/1998  | Kahn ............................. 396/427 |
| 5,898,459 | A |   | 4/1999  | Smith et al. |
| 5,957,000 | A | * | 9/1999  | Pecorari .......................... 74/425 |
| 6,027,357 | A |   | 2/2000  | Howell et al. |
| 6,268,882 | B1 | * | 7/2001  | Elberbaum ................... 348/151 |
| 6,485,185 | B1 | * | 11/2002 | Conway et al. ............... 384/484 |
| 6,715,940 | B2 |   | 4/2004  | Top et al. |
| 6,820,980 | B1 |   | 11/2004 | Romanoff et al. |
| 6,880,987 | B2 |   | 4/2005  | Diana et al. |
| 7,019,785 | B2 |   | 3/2006  | Masuyama et al. |
| 2002/0172518 | A1 | * | 11/2002 | Watson ......................... 396/428 |
| 2003/0077082 | A1 |   | 4/2003  | Ito |
| 2003/0136211 | A1 | * | 7/2003  | Ishii et al. ................. 74/388 PS |
| 2006/0216019 | A1 | * | 9/2006  | Thompson .................... 396/427 |

\* cited by examiner

*Primary Examiner* — Joon H Hwang
*Assistant Examiner* — Sherman Lin
(74) *Attorney, Agent, or Firm* — Haynes and Boone, LLP

(57) ABSTRACT

A pan tilt tracking mount is disclosed. In a first embodiment, the pan tilt tracking mount includes an at least one housing, wherein interior dimensions of the at least one housing are precisely defined; a first assembly located within the at least one housing based upon at least one of the precisely defined interior dimensions, the first assembly including a first shaft and a first worm gear set, wherein the first worm gear set allows tilt rotation of the first assembly; and a second assembly located within the at least one housing based upon at least one of the precisely defined interior dimensions, the second assembly including a second shaft and a second worm gear set, wherein the second worm gear set allows pan rotation of the second assembly.

27 Claims, 6 Drawing Sheets

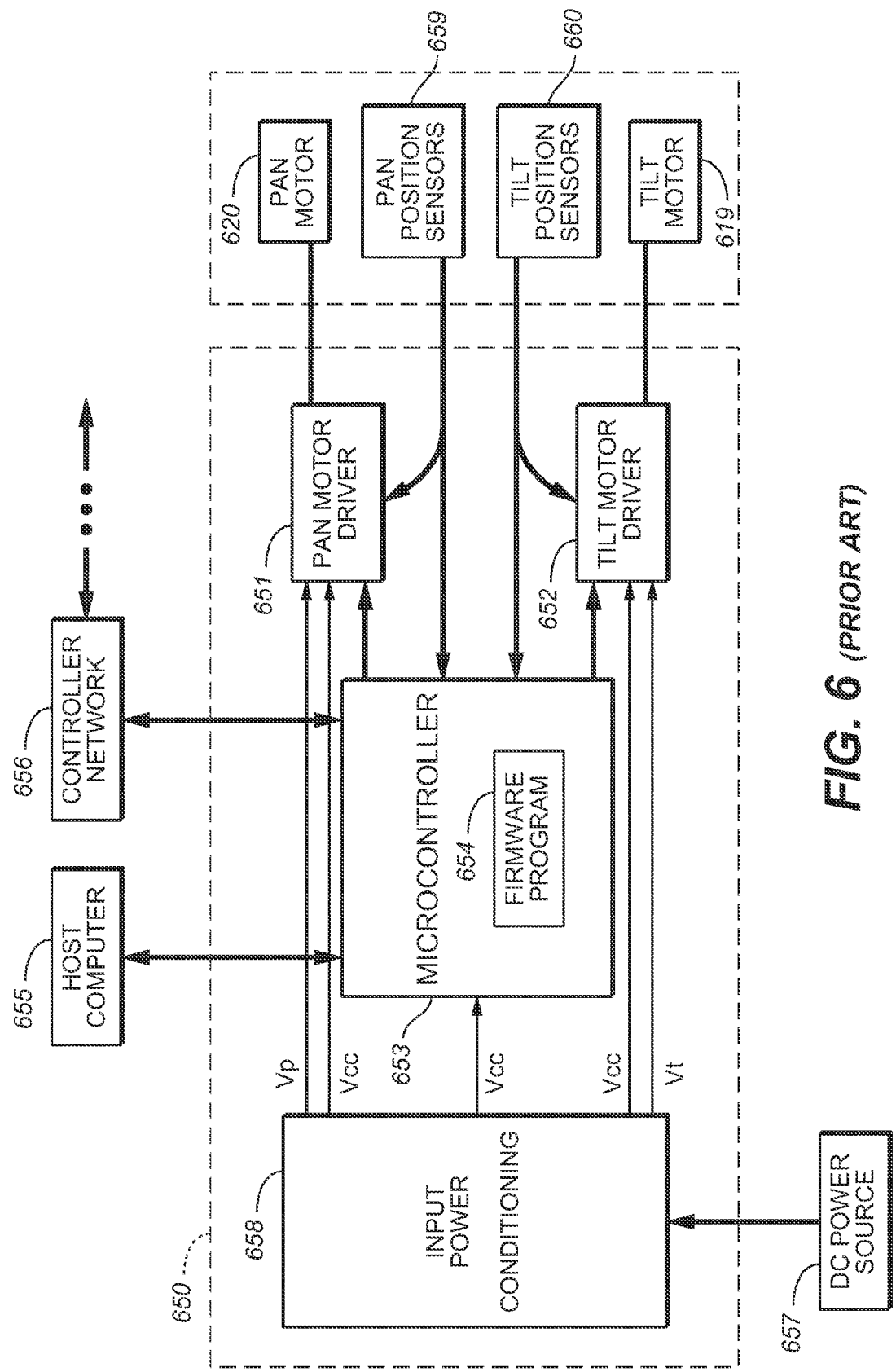
FIG. 6 *(PRIOR ART)*

PAN/TILT TRACKING MOUNT

CROSS-REFERENCE TO RELATED APPLICATIONS

This application claims the benefit of priority to U.S. Provisional Application No. 60/791,677, filed Apr. 12, 2006, all of which is incorporated herein by reference.

FIELD OF INVENTION

The present invention relates generally to tracking systems and more particularly to pan-tilt tracking mount systems.

BACKGROUND OF THE INVENTION

Highly accurate and fast computer-controlled pan-tilt mounts have been used in the field of tracking for decades (e.g., for missile tracking, U.S. Pat. No. 3,559,937, target tracking, weapon/gun mount). Tracking mounts provide for precise and fast computer control of pan and tilt position, speed and acceleration. These tracking mounts have been intrinsically complex and costly since they typically carry large payloads (e.g., greater than 20 pounds), and they position with great accuracy (e.g., 0.01 degrees) and speed (e.g., over 300° second).

Recent advances in the fields of image processing, computer vision and robot vision have shown that active control of sensor pan-tilt position can facilitate and simplify computer computations that support a wider range of activity than a passive sensor. Advances in low cost and powerful digital signal processors (DSP), accurate and miniature solid state cameras, sensor processing algorithms, and robotics have made sensor-based control of pan-tilt position applicable to a wide range of uses. Growth in these applications has been impeded due to lack of a suitable low cost pan-tilt mount.

Motorized pan-tilt mounts have achieved widespread use in the fields of surveillance and security (e.g., U.S. Pat. Nos. 4,673,268 and 4,937,675). Often used outdoors or under harsh conditions, these mounts are often weatherized. These pan-tilt tracking mounts typically achieve medium to large payload capacity with small motors by the use of large mechanical speed reductions. Thus, they are generally too slow for most tracking applications. Though pulse-width modulation (PWM) and constant-current motor drivers achieve better motor performance (e.g., better acceleration, higher switching rate, better dynamic torque), and advances in single chip high power microelectronics have made (PWM) constant current devices economically competitive, many prior art security motor drivers used simpler voltage drivers due to their simplicity and historically lower cost.

Precision is not typically inherent in conventional designs since their mechanical speed reductions are frequently subject to backlash (e.g., as from spur gear trains), slippage (e.g., as from belt drives), and other mechanical effects. Medium-sized payloads include advanced sensors including thermal and visible cameras with high zoom factor lenses, spotlights, lasers, antenna, and other sensors and output devices. In addition, human and very simple automated pan-tilt controls in the prior art (e.g., joystick operation, or fixed scanning and position presets) are not generally amenable to integrated computer control of mount position in response to changes in sensor input A miniature pan-tilt tracking mount was disclosed by Kahn in U.S. Pat. Nos. 5,463,432 and 5,802,412. These patents disclose an advanced positioning device and controls suitable for real-time host computer control for applications including target acquisition and tracking for cameras and antennas, stabilization, image mosaicing, and autonomous remote surveillance. These pan-tilts maintain a large ratio of motor size to armature weight, and the primary drive mechanism is a worm drive. The mechanical system in the Kahn patents is particularly well suited to smaller payloads (e.g., less than 10 pounds). The simple mechanism provides features required for many advanced applications that include extremely high accuracy, low parts count, rugged reliability, high duty-cycle, dynamic rigidity, fine resolution and high accuracy. These devices have been manufactured and sold commercially by Directed Perception, Inc., Burlingame, Calif.

Motorized pan-tilt mounts for heavy payloads have achieved widespread use in the fields of surveillance and security. These pan-tilt mounts typically achieve medium to large payload capacity with relatively small motors by the use of large mechanical speed reductions, which makes them slow for tracking applications. For those few pan-tilts in this field that provide high payload and high speed, the best positional accuracy and dynamic rigidity obtained in the field is typically only about 0.25 degree, and high duty-cycles are not generally feasible. Precision is not typically inherent in prior art designs. Many of these devices employ drive mechanisms that have poor dynamic rigidity and which can lose fine position over time, including belt drives, cable and pulley drives, and spur gear trains with substantial gear backlash. These mechanisms typically lose performance over wide temperature ranges that can be seen in outdoor applications, and some of them cannot perform continuous rotations (a requirement for many advanced applications). Some security system pan-tilts use worm drives for their heavy payload devices, but they do not provide: precise gear meshing, axis preloading that is required for high mechanical and dynamic rigidity, metal gear lubrication bath for heavy payloads and high duty cycles, fast movement, computer controls required to support advanced applications, or high motor to armature ratios.

In military and other specialized pan-tilt fields, there are pan-tilt tracking mounts that can move heavy payloads with high speed, accuracy and dynamic rigidity. To meet these requirements, designs frequently are gimbaled (using upright support yokes) in order to mount the heavy payload closer to the confluence of the pan and tilt axes, which reduce the generated torques. These gimbal designs are larger than the compact realization described by Kahn and others, and the yoke limits the payload dimensions that can be mounted within the yoke. In addition, special attention must be paid to maintaining torsional rigidity on yoke designs, which can increase overall system weight and complexity. In order to achieve high dynamic rigidity on these larger systems, more complicated bearing and preload mechanisms are frequently employed. These systems can be more complicated and expensive than those employed in the commercial and industrial sectors.

Direct drive mechanisms have been applied to pan-tilt mounts, but compared to geared systems they use larger motors and higher current levels, large motor currents can require larger and more expensive continuous rotation slip rings, very high resolution feedback encoders are required to obtain high positioning resolution with the resulting high cost and increased complexity of control and electronics, small position movements and holding can be less reliable and steady than a geared system (e.g., a large pitch angle worm), and large direct drive motors with hollow shafts are unusual and expensive so placement of slip rings and internal wiring can be problematic.

Accordingly, what is needed is a system and method that addresses the above-identified issues. The present invention addresses such a need.

SUMMARY OF THE INVENTION

A pan-tilt tracking mount is disclosed. The pan-tilt tracking mount includes at least one housing, wherein interior dimensions of the at least one housing are precisely defined. The pan-tilt tracking mount further includes a first assembly located within the at least one housing based upon at least one of the precisely defined interior dimensions. The first assembly includes a first shaft and a first worm gear set, wherein the first worm gear set allows tilt rotation of the first assembly, and the pan-tilt tracking mount further includes a second assembly located within the at least one housing based upon at least one of the precisely defined interior dimensions. The second assembly includes a second shaft and a second worm gear set, wherein the second worm gear set allows pan rotation of the second assembly.

The pan-tilt tracking mount may include a set of precisely designed features within the interior housing of the pan-tilt tracking mount.

BRIEF DESCRIPTION OF THE DRAWINGS

FIG. 6 shows a block schematic of pan-tilt tracking mount-controller components and connections, according to an embodiment.

DETAILED DESCRIPTION

Figure 1:
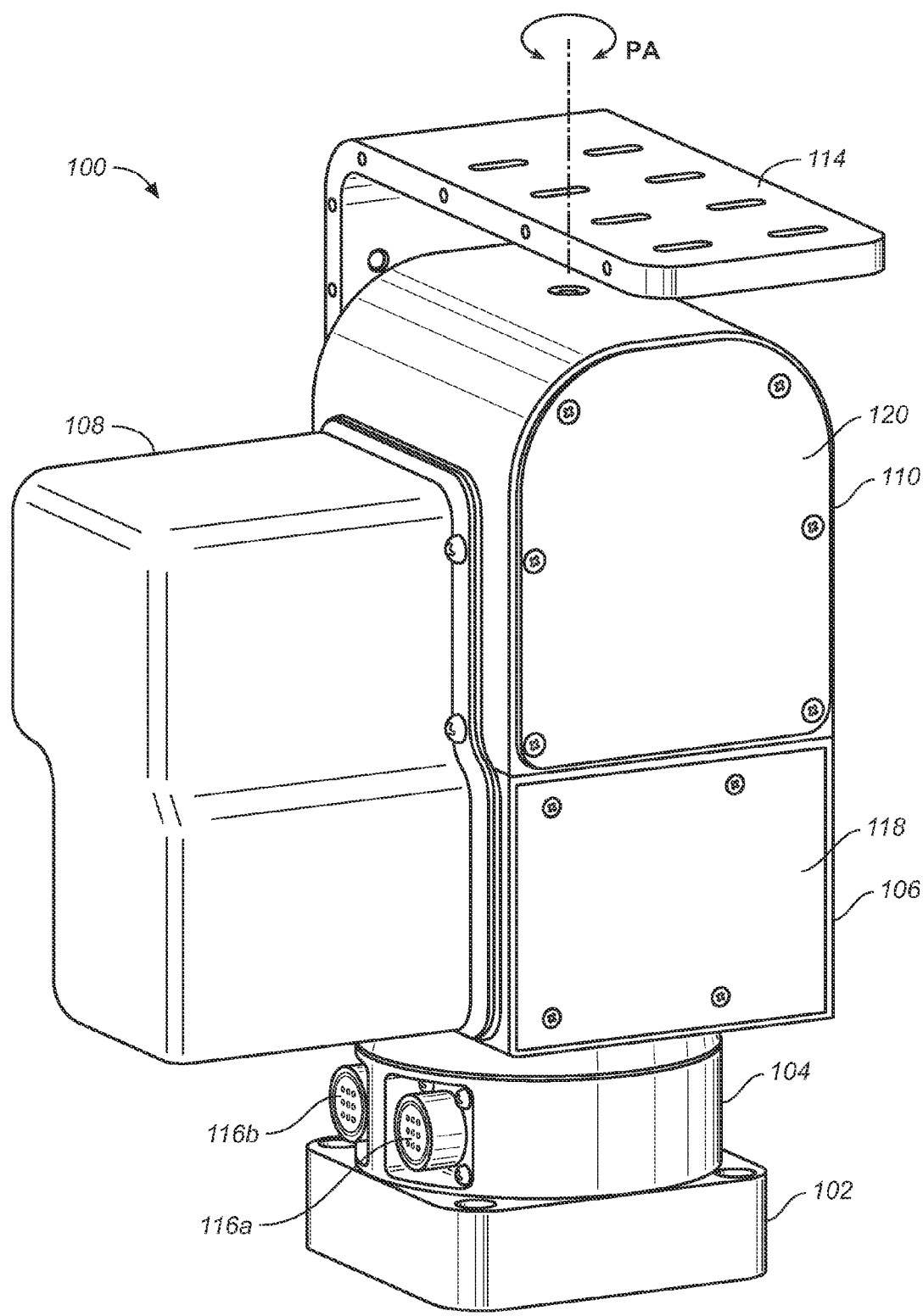
FIGS. 1 and 2 are perspective views of a pan-tilt tracking mount, according to an embodiment.

The present invention relates generally to tracking systems and more particularly to pan-tilt tracking mount systems. The following description is presented to enable one of ordinary skill in the art to make and use the invention and it is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A method and system of the present invention may include a heavy duty pan-tilt tracking mount designed for larger payloads (e.g., greater than 10 pounds) that provides capabilities not available in prior art in terms of its positional accuracy (e.g., 0.01 degrees), high dynamic rigidity, sturdy construction for increased reliability, ability to perform under continuous duty-cycle, precise control of speed and acceleration, ease of precise assembly, suitability for internal wiring and sealing against environmental contaminants, flexibility in selection of slip ring assemblies for continuous axis rotation and alternative wiring methods, flexibility of payload mounting arrangements, ease of integration of payload electronics, gravity independent pan-tilt mounting (e.g., it can be mounted upside down), integrated microprocessor control and interface, and low parts count and suitability for low-cost manufacture in high volume.

A system and method in accordance with the present invention includes a motorized, rotational-tilt axis mounted upon a motorized, rotational-pan axis. For each axis, the motors and worm gear set mount into a single mechanically precise housing to provide for precise motor and gear mesh symmetry. The housing provides for precision location of gear and shaft components, which provide low-backlash gear meshing and reliable gear operation. During assembly, the precision housing allows for direct measurements of relative shaft and gear positions that allow precise and direct shaft and gear position adjustments. Conventional pan-tilt tracking mount systems have difficulty properly locating gear and shaft elements, they can require costly adjust and test cycles, and their lack of established gear and shaft geometry can preclude precise gear geometry assembly which can degrade gear life and precision.

In an embodiment, each axis, a worm gear fixed to the motor shaft bi-directionally rotates a worm wheel mounted upon the orthogonal load axis shaft. In the embodiment, each axis shaft is hollow in order to allow for internal wiring of pan-tilt controls and base-to-payload pass-through electrical connections. A payload mounting hub is fixed to the tilt axis shaft to provide for attachment of the payload to the pan-tilt device and for the exchange of electrical signals between the pan-tilt device and the mounted payload. The pan axis shaft is fixed to a sealed base pedestal that can be bolted to a mounting surface. The base also houses the input/output connectors, optional pan axis slip ring(s), and additional application electronics.

Each load axis shaft is fixed to its housing with bearings to maintain precise axial alignment and high payload capacity. A worm wheel is precisely fixed to each load axis shaft and is driven by a worm gear fixed to a worm gear shaft. Each motorized worm gear shaft is mounted to bearings that are embedded into bearing housings. These bearing housings are provided with a simple bearing position adjustment means for ensuring high quality worm gear set mating, very low gear backlash, very high system stiffness, and good gearset wear patterns. High axial thrusts are typically inherent when moving heavy payloads, so a simple mechanical adjustment is provided to obtain the required high axial preload between each bearing set and its mounted shaft. Each worm gear set can be housed in a sealed oil chamber with fluid lubricant to decrease gear friction, provide gear cooling, and to transport gear debris away from the gear mesh. The seal oil chamber can prevent gear damage caused by heavy payloads and high duty cycles that can create high local gear pressures and spot heating (e.g., pitting and spalling). After initial assembly, the gear set can be run-in to obtain smoother and more precise gear mesh and centerline reduction in order to increase system accuracy and reduce backlash. Debris generated from the run-in can be flushed from the sealed oil chamber, and the oil chamber can be easily refilled with fresh lubricant.

A method and system in accordance with the present invention includes motor drive electronics and microcontroller execution of host computer commands to effect precise control of pan-tilt mount speed, acceleration, position, and configuration. In an embodiment, upon reset the microcontroller precisely moves the mount to a repeatable and known "home" position using electrical sensor feedback from the mount (e.g., limit switch, encoder feedback). In an alternative embodiment, an absolute feedback sensor (e.g., precision resolver) on the driven axis can be used to determine axis position without the requirement to move through a calibration process. Precise motor rotation relative to the home position is maintained by the microcontroller (e.g., by step count for open-loop stepper control, or, encoder feedback for closed loop control).

A method and system in accordance with the present invention shares advantages described by Kahn U.S. Pat. No. 5,463,432 which include high relative torque for its size owing to the large ratio of motor size to armature weight, precise control of pan-tilt position, speed and acceleration, the use of worm gears to provide compact high gear reduction ratios with minimal backlash (owing to their sliding action) and inherent locking features owing to their pitch angles, and precise integrated control electronics. Yet, the pan-tilt disclosed in Kahn is not able to handle heavy payloads. As payload weight increases, gear pitch and bearing sizes must also increase, which makes it harder to preserve device accuracy. High gear torques created by heavy payloads may not be suitable for grease lubrication as disclosed in Kahn.

Improvements over U.S. Pat. No. 5,463,432 have been made to accommodate the demands of larger payloads which includes: independently adjustable bearing support for each worm gear end shaft to allow fine gear mesh positioning/adjustment and to absorb higher impacts resulting from larger payloads, additional preload mechanisms for bearings to obtain stiff preload and to absorb impact loads without significant effect on device accuracy or gear reliability, provision for immersing the gearset in an oil bath to handle high gear mesh forces and reliably provide for continuous duty cycles, the addition of hollow load axis shafts that allow for internal wiring and continuous axis rotation using slip rings, the fixing of the pan housing to the tilt housing so that tilting payloads do not strike the lower pan housing, and the addition of a general pedestal mount that provides for easy modification of the slip ring(s) used to allow for continuous pan rotation and the embedding of other electronics, sensors, connectors, and alternative mechanical attachments to the pan-tilt base. The method and system of the present invention provides the requisite improvements over Kahn that is required for heavy payloads while offering many of the same advantages disclosed by Kahn.

An advantage over the prior art is provided by the ability of a system and method of the present invention to move heavy payloads while maintaining high system stiffness and low system backlash, within a simple mechanism that has a low parts count and which can be readily assembled with precision without the need for complex or expensive tooling or measurement equipment.

Figure 2:
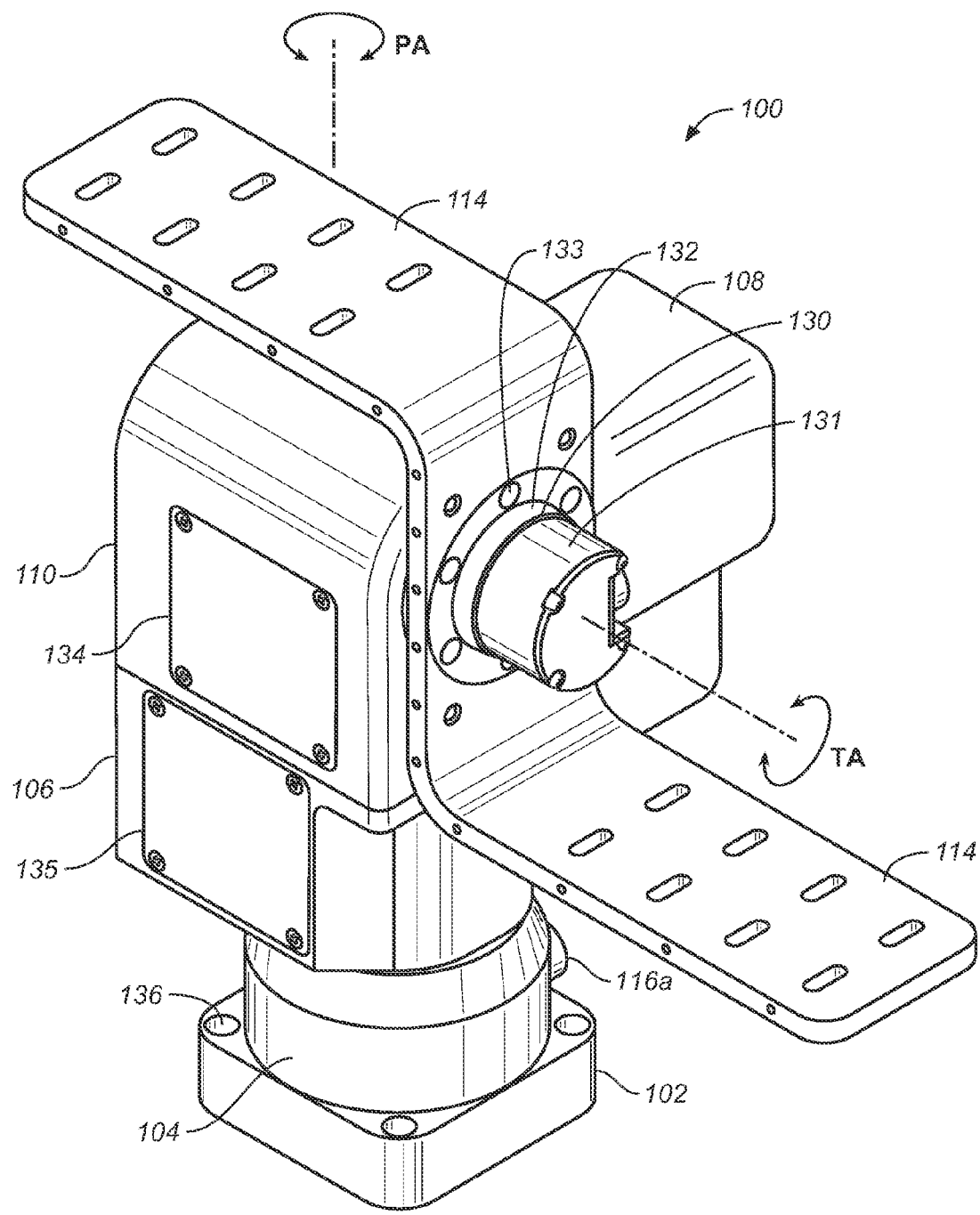

FIGS. 1 and 2 are perspective views of a pan-tilt tracking mount in accordance with the present invention. The pan-tilt tracking mount 100 comprises a base mount 102, pedestal housing 104, a pan housing 106, a tilt housing 110, and a pan and tilt motor housing 108. The base mount 102 is fixed to a mounting surface using a plurality of bolts 136. As shown, the base mount 102 is fixed to the pedestal housing 104, having two base connectors 116a and 116b, and the pedestal housing 104 is fixed to the pan axis shaft. The tilt housing 110 is fixed to the pan housing 106. A payload hub 130 is fixed to the tilt axis, whereupon rotation of the tilt shaft causes an equivalent rotation of the payload hub 130. Electrical connections from the base connectors and internal pan-tilt electronics are connected to a payload connector housing 131 which includes a payload connector 132. One or more payload brackets 114 can be fixed to the payload hub 130 using a plurality of screws 133 that thread into the payload hub 130.

As shown in FIGS. 1 and 2, the base mount 102, pedestal housing 104, and base connectors 116 are stationary relative to the fixed mounting surface. Rotation of the pan axis rotation angle (PA) by the internal pan gear and motor mechanisms (not shown) rotates the pan housing 106 and tilt housing 110 together, which results in the panning rotation of the payload and its payload brackets 114, payload hub 130 and payload connector 132 and its housing 131.

In an embodiment, the pan housing includes a slipring, and then the pan axis PA can be continuous. Otherwise, the pan housing is limited in its range of motion by internal electronics and/or mechanical stops to prevent against damage to internal cables and external payload cables. Rotation of the tilt axis rotation angle (TA) by the internal tilt gear and motor mechanisms rotates the tilt shaft (not shown) which is fixed to the payload hub 130, payload connector housing 131, payload connector 132, and the payload bracket(s) 114.

In the embodiment, electrical signals are transferred to the payload connector 132 by high flex cables, and the tilt axis must then be limited in its range of motion by internal electronics and/or mechanical stops to prevent damage to internal tilt cables and external payload cables.

In an alternative embodiment, the tilt housing can incorporate an additional tilt axis slip ring to provide continuous tilt axis rotation. Access to the tilt axis wiring can be accessed via a tilt housing cover 120 which seals against contaminants. Pan-tilt control electronics are housed in the pan housing 106, and access is provided via a pan housing cover 118 which is sealed against contaminants. Tilt worm shaft bearing adjustments are accessed via the tilt bearing cover 134, and pan worm shaft bearing adjustments are accessed via the pan bearing cover 135.

To describe the features of the Pan-tilt tracking mount in accordance with a method and system of the present invention, refer now to the following description in conjunction with the accompanying FIGURES.

Figure 3:
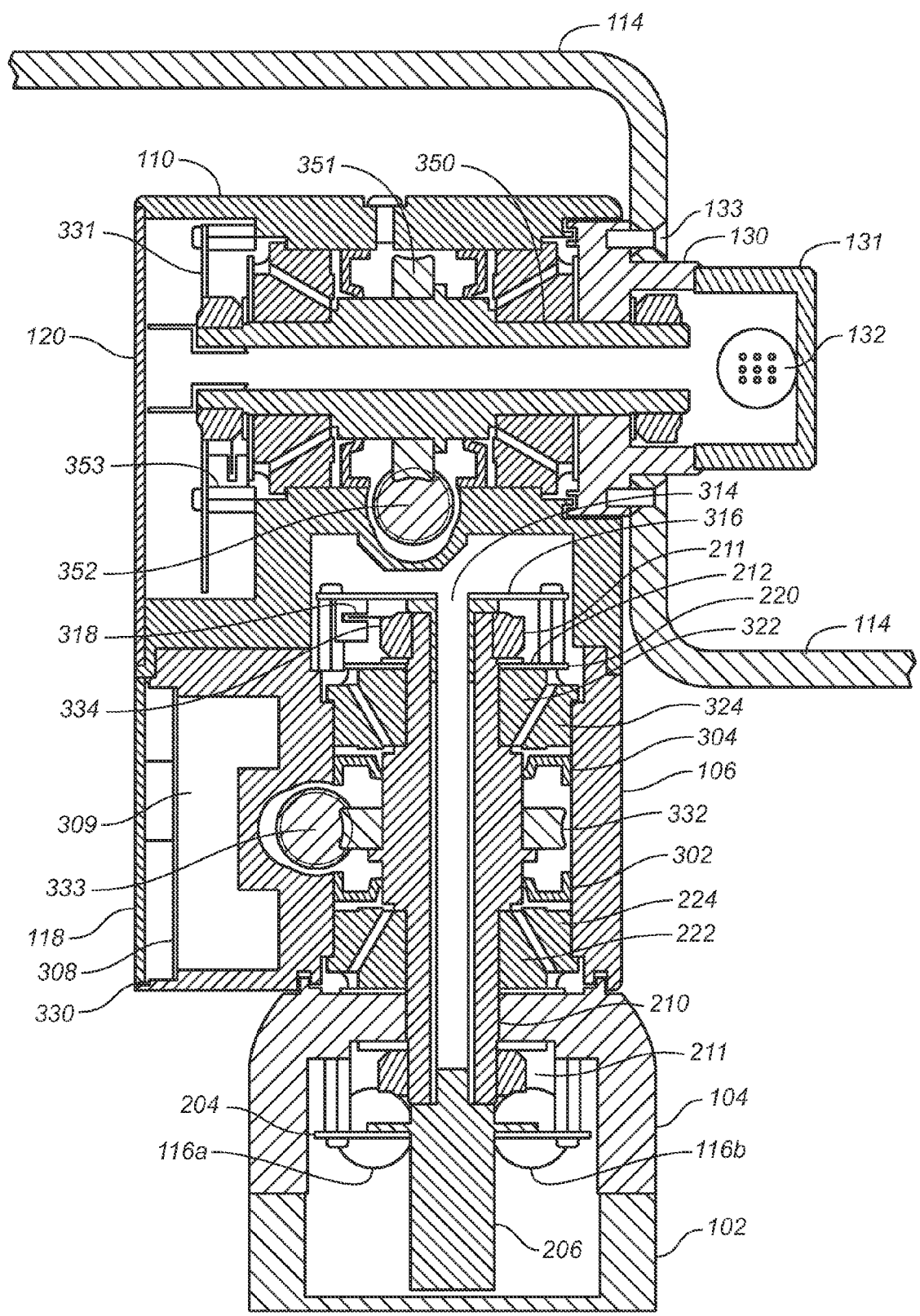
FIG. 3 is a front cutaway perspective of the pan-tilt tracking mount, according to an embodiment.
Figure 4:
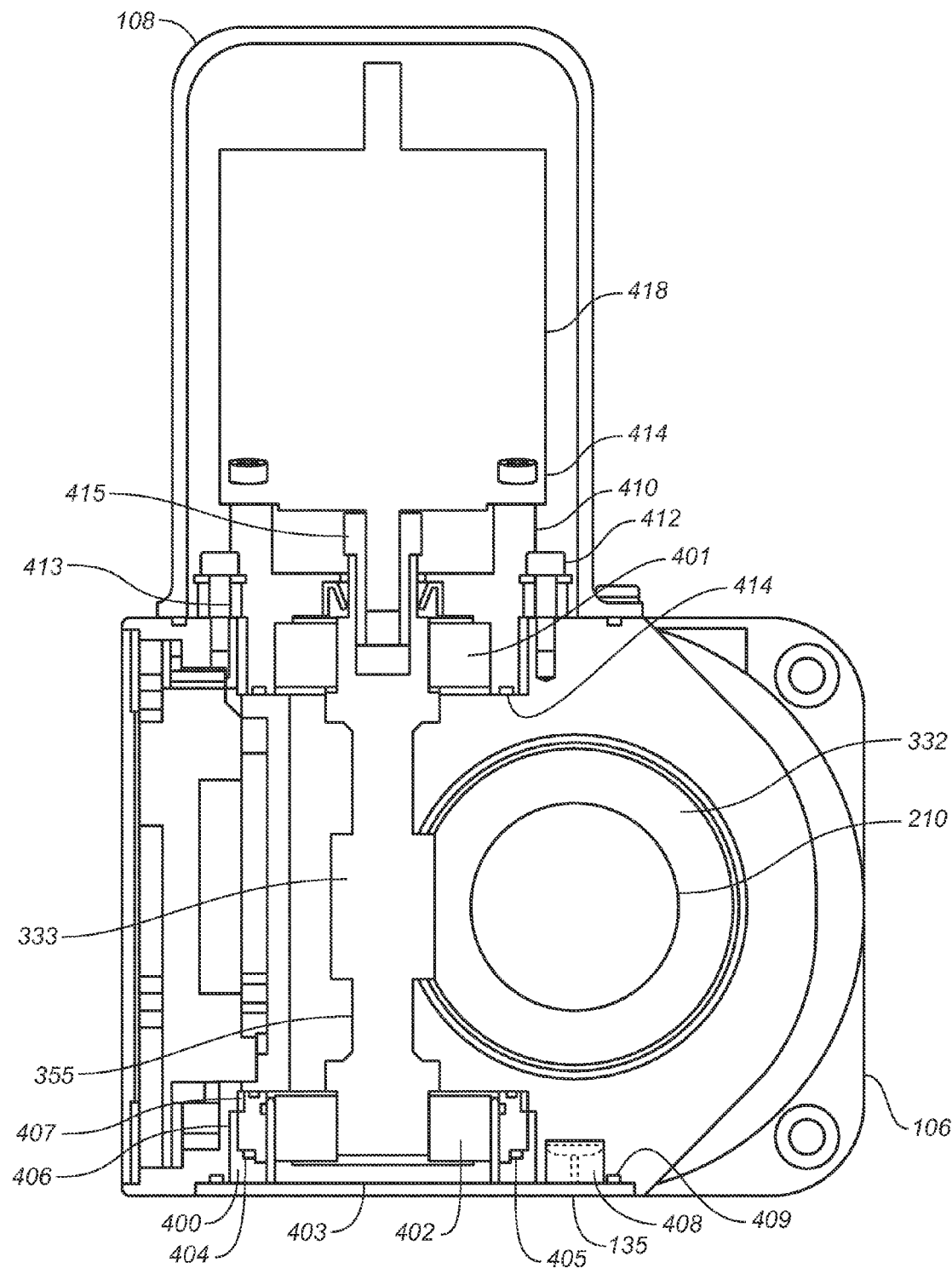
FIG. 4 is a top cutaway perspective of the pan axis, according to an embodiment.

FIG. 3 is a cutaway, front perspective view of the pan-tilt tracking mount 100. FIG. 4 is a cutaway, top perspective view of the pan-tilt tracking mount 100. The following will describe the features of the mount thereof and their interactivity.

Base Mount 102 and Pedestal Housing 104

As shown in FIGS. 3 and 4, the base mount 102 is fixed to a mounting surface, so that the base mount 102 is stationary relative to the mounting surface. The base mount 102 in turn is fixed to a pedestal housing 104. For an embodiment, attached to the pedestal housing 104 is one or more base electrical connectors 116a, 116b for providing electrical interface between the outside and the device. Alternative embodiments can allow non-electrical signals to pass over alternative connectors (e.g., via fiber optics). The electrical connectors 116a, 116b in turn connect to an input PCB 204. For example, the circuitry on the input PCB 204 may include input power capacitors and in-line fuses. The PC board 204 also provides flexibility for input electrical wiring, and provides a mechanical attachment to a slip ring 206 within the pedestal housing 104. For embodiments, a suitable slip ring 206 is an Electrotech H18+4, which has 14 two-amp circuits and four six-amp circuits. For an embodiment, the function of the slip ring 206 is to allow continuous rotation on the pan axis without need for electrical wires. Alternative embodiments can replace the slip ring 206 with flexible circuits to reduce component cost and change signal pass through characteristics, and in this case, electrical and/or mechanical means for restricting pan range of motion are required to prevent damage to the flexible circuits.

The design of the pedestal housing 104 may be enlarged so that the pedestal housing stays the same or the base mount 102 may be enlarged or modified to facilitate larger-sized slip rings and or additional electronics and base connectors within the base. As shown in FIG. 3, the pan shaft 210 extends down into the pedestal housing 104. A key (not shown) is pressed between the pedestal housing 104 and a slot in the pan shaft 210. A washer 212 is inserted over the pan shaft 210. Also, a precision shaft lock nut 211 is tightly threaded down upon the pan shaft to fix and/or fasten the pan shaft 210 to the pedestal housing 104.

In an embodiment, the pan shaft 210, along with other components within the pan housing such as the worm gear set are highly engineered parts. That is, the pan shaft, worm wheel, and worm gear have precisely-defined dimensions. In an embodiment, AGMA 10 worm gearsets are employed. The use of precision worm gear sets, combined with the precise locating afforded by the pan and tilt housings, allow for precise gear mesh geometry in order to reduce backlash and improve overall positioning accuracy and dynamic rigidity.

Furthermore, a grease seal 220 seals two bearing components 222 224 which form tapered roller bearings. The two bearing components include a tapered-roller bearing cone 222 and a tapered-roller bearing cup 224. For an embodiment, the tapered roller bearing cup 224 is flanged. Tapered roller bearings provide a very high payload capacity, and their conical geometry accurately locates the bearing axis when preloaded, thus reducing worm wheel runout. Alternative embodiments can use other bearing types, keeping in mind the need to maintain good concentricity of worm gears in order to avoid inaccuracies introduced by worm wheel eccentricity.

All of the components and parts above the pedestal are inserted into the pan housing 106 such as the grease seal, which interfaces the pan housing 106 and the pedestal housing 104.

For the embodiment shown in FIG. 3, the pedestal housing 104, pan shaft 210, grease seal 220, and tapered-roller bearing cone 222 are stationary relative to the mounting surface. Suitable tapered-roller bearings for this embodiment are both Timken 15100 and 15250B series bearings.

Pan Housing 106

Above the bottom roller bearings 222 224, an oil seal 302 is shown. The outer circumference of the oil seal 302 is fixed and pressed in against the pan housing 106. The inner circumference of the oil seal 302 contacts a journal on the pan shaft 210. In one embodiment, the oil seal 302 utilizes a Viton, spring-loaded seal. For an embodiment, the spring-loaded seal may ensure that, if the seal wears, it maintains its seal. Alternative seal types (e.g., Teflon) may be required to operate at extreme temperatures (e.g., −40° C.).

Next, moving along the pan shaft in FIG. 3, the pan worm wheel 332 is shown. In the present embodiment, the phosphor-bronze pan worm wheel 332 is heat shrunk onto the pan shaft 210 by the gear manufacturer, such that the worm wheel 332 remains fixed to the pan shaft 210 and is positioned in a precise location. The pan worm wheel 332 is meshed with the pan worm gear 333. Continuing up the linkage, an oil seal 304, bearing set 322, 324, grease seal 220, washer 212, and precision shaft lock nut 211 are shown. Tightening of the shaft lock nut 211 preloads the pan axis linkage to fix the axial position of the pan worm 332 and shaft 210, and this provides a very stiff linkage that can provide accurate gear positioning that can withstand high impacts and high dynamics that are inherent in larger payloads.

A pan axis feedback mechanism is used to precisely sense the absolute rotational position of the pan housing 106 relative to the pan shaft 210 that is fixed to the base mount 102. In an embodiment, a pan vane 334 is fixed to the top pan shaft lock nut 211. The vane defines the limits and range of motion for the pan axis. A precision non-contact optical sensor 318 (e.g., Omron EE-SX493) precisely detects when the vane 334 interrupts an optical beam, and the absolute axis position is set using the limits defined by the edges of the vane 334 when the interruption of the optical beam changes state. The pan-tilt firmware inputs limit sensor state to calibrate the pan axis very precisely, such that the absolute position of the pan housing 106 relative to the base mount 102 may be established with high repeatability and accuracy. In alternative embodiments, the vane 334 and limit subsystem can be replaced with alternative position sensors (e.g., an absolute encoder or resolver).

Electrical contacts from the slip ring 206 route up the hollow pan axis shaft 210, and these electrical connections terminate onto the pan PCB 316, which provides electrical connections required to interface with other electronics within the device and connections to the payload connector 132. The pan PCB 316 incorporates the limit sensor 318 and its related electronics and connections to the pan-tilt control electronics.

Within the pan housing 106, the pan-tilt control electronics 308 reside within a cavity 309 in the pan housing 106. The pan-tilt control electronics 308 precisely control the pan-tilt motors, receive input from internal position and temperature sensors, communicate with external interfaces to receive and send real-time control commands and responses, and regulate power. In the present embodiment, an embedded microprocessor executes an embedded real-time firmware program to effect control over all pan-tilt functions.

FIG. 4 shows a top cutaway perspective of the pan axis to show the worm gear and motor drive system. The pan shaft 210 is fixed to a pan worm wheel 332. The pan worm wheel 332 is engaged and meshed with the pan worm gear 333. In an embodiment, the pan worm gear 333 is machined integral to the pan worm gear shaft 355. The pan worm gear 333 is fixed to the pan motor 418 shaft, such that pan motor shaft 412 rotation rotates the pan worm 333 which causes the pan worm wheel 332 to rotate accordingly.

The pan worm gear shaft 355 is supported by a motor side bearing 401 and front bearing 402. Each of these bearings 401 402 are housed in bearing holders that provide for cross axial position adjustment in two dimensions, and axial thrust adjustment for bearing preload to provide a very stiff linkage that can provide accurate gear positioning that can withstand high impacts and high dynamics that are inherent in larger payloads.

The motor side bearing 401 is pressed into a motor bearing block 410. The motor bearing block 410 is attached into a recess in the pan housing 106 using four screws and washers 412. The recess location and shape in the pan housing 106 is known with high accuracy to allow for simpler and precise assembly of the worm gear mesh and its geometry. The through holes in the motor bearing block 410 are larger than the screw diameters 412 in order to allow for two dimensions of adjustment of the bearing block 410 location relative to the pan housing 106 recess. The motor side bearing 401 is immersed in the gear mesh oil bath, so sealing of the bearing block 410 is required. The motor bearing block 410 compresses an O-ring 414 static seal against the pan motor housing 106. The pan worm shaft 333 exits the housing for attachment to the pan motor. A shaft seal 413 is pressed into the motor bearing block 410, in which the outer circumference of the shaft seal 413 is fixed and sealed to the bearing block 410, and the pan gear shaft 355 dynamically rotates against the inner shaft seal 413 lip. In a particular embodiment, a spring loaded Viton shaft seal may be used. Alternative seal types (e.g., Teflon) may be required to operate at extreme temperatures (e.g., −40° C.).

The front bearing 402 is housed within a threaded bearing cup 403. The bearing cup 403 is threaded into a front bearing block 404. The bearing block 404 is attached into a recess in the pan housing 406 using four screws and washers 405. The recess 400 location and shape in the pan housing 106 is known with high accuracy to allow for simpler and precise assembly of the worm gear mesh and its geometry. The through holes in the bearing block 404 are larger than the screw diameters 405 in order to allow for two dimensions of adjustment of the bearing block 404 location relative to the pan housing recess 400. Axial preload of the front bearing 402 is achieved by rotating the bearing cup 403 into the front bearing block 404. The front bearing 403 is immersed in the gear mesh oil bath, so sealing of the bearing holders is required. Sealing is provided by a bearing cup O-ring seal 406 that is compressed between the cup 403 and housing 404, and a bearing block 404 O-ring seal 406 is compressed between the bearing block 404 and the pan motor housing 106.

In an alternative embodiment, for smaller payloads and reduced torque and impact loads, the front bearing can be omitted such that the work gear is cantilevered (e.g. as in U.S. Pat. No. 5,463,432). Access to the oil bath for filling and flushing is provided via two access ports and sealing screws 408. The front bearing assembly has a pan bearing cover 135 which has an O-ring seal to restrict ingress of environmental contaminants.

The pan motor 412 (e.g., Oriental Motor PV267-02AA) mounts to the motor bearing block 410 using four screws and washers 414. The screw 414 diameters are smaller than the motor 412 mount through holes in order to allow the motor shaft to align itself with the pan worm shaft 333. In a particular embodiment, the pan motor 412 shaft is attached to the pan worm shaft 333 using a compression nut 415 (e.g., Shaftloc) to provide simple attachment and removal of the motor while providing good axial alignment. A motor housing 108 seals the motors and internal components against ingress of external contaminants.

The gear mesh oil bath provides good operating characteristics, but it can increase the unit size, parts count, assembly time, and cost. For applications in which pan-tilt loading and duty-cycle requirements allow, alternative embodiments can replace the gear mesh oil bath with alternative lubrication means (e.g., grease, gear coatings). This can allow the omission of dynamic oil seals 413 302 304 providing a reduction in cost, assembly time and complexity, and a reduction output losses attributed to seal friction.

Tilt Housing 110

The tilt housing 110 is fixed to the pan housing 106. The tilt axis drive mechanism is similar to the pan housing drive mechanism. In FIG. 3, a tilt shaft 350 is fixed to a tilt worm wheel 351. The tilt worm gear 352 is meshed with the tilt worm wheel 351 to effect rotation of the tilt axis TA. The tilt worm gear 352 is fixed to a tilt worm gear shaft 352 which is fixed to the tilt motor. Bi-directional rotation of the tilt motor then rotates the tilt worm wheel to effect tilting movements. As with the pan axis, a tilt shaft position sensor 353 is used to precisely calibrate the tilt shaft 350 position relative to the tilt housing. A tilt PCB 331 connects to the tilt position sensor 353 and other signals from the pan-tilt controller 308, the base connector(s) 116, and the payload electrical connections. Signals between the pan-tilt controller 308 and base connector(s) 116 are routed to the payload via the hollow tilt shaft 350. In an alternative embodiment, the tilt shaft 350 can be extended through the tilt housing cover 120 to obtain a dual side tilt drive.

A payload hub 130 is fixed to the hollow tilt shaft 350, whereupon rotation of the tilt shaft 350 causes an equivalent rotation of the payload hub 130. One or more payload brackets (114) or other payloads can be fixed to the payload hub 130 using a plurality of screws 133 that thread into the payload hub 130. Electrical connections from the base connectors and internal pan-tilt electronics are connected to a payload connector 132 which is fixed to a payload connector housing 131, which is fixed to the payload hub 130. In an alternative embodiment, the payload connector housing 131 and payload connector 132 are replaced by a special hub attached to a payload, and electrical signals can be routed internal to the payload with no externally accessible connections.

Worm Rear Set Assembly and Alignment

Now that the basic gear mechanism is assembled, the alignment technique is critical to establish that the worm gears have coincident centerlines and are properly meshed. For each axis, a system and method in accordance with the present invention mounts the gearset, bearings/mounts, and the motor into a single precision housing.

The single precision housing per axis in the present invention serves two important functions. First, it positively locates the mechanical elements into a known and precise geometry. It is well known in the art that good worm gear performance requires precise mounting geometry. Failure to establish good gear geometry results in gear eccentricities and other problems that cause a binding on one gear side and significant backlash at the opposing gear side, excessive wear and heating, loss of torque, and other problems. Secondly, a single precision housing per axis provides a unified reference for assembly. Mechanical linkage stack up dimensions can vary quite significantly. For example, AGMA 10 worm gear sets are sensitive to variations in gear mesh separation as small as 0.0005", whereas bearing/washer/locknut/shaft heights after preload tensioning can vary more than 0.020". As the mechanical elements are assembled into the housing, their position relative to the housing can be measured, and offsets from nominal positions can be used to simply and accurately adjust the opposing gear element nominal positions.

In the assembly, the driven axis shaft and its fixed worm wheel are first assembled into the housing (e.g., in FIG. 3, pan shaft 210 and its fixed worm wheel 332 are assembled into the pan housing 106 before the pan worm gear 333 is assembled). The rotational axis of the driven axis shaft is determined by the housing bore locations, with variability of gear position restricted to the single dimension of displacement along the axis.

In a preferred embodiment, the housing bore for the driver shaft axis shaft bearings is machined from a single side to obtain higher tolerances for the alignment hence more accurate shaft position can be obtained using standard machine practices. After installation of the axis shaft (e.g., 210 in FIG. 3), the assembly technician uses common tools of the art (e.g., a depth gauge) to precisely measure the axial position of the shaft in the housing, and this variance from nominal axial position can be used to simply and precisely determine the offsets from nominal required when assembling the worm gear shaft bearings to the housing. In the present embodiment, the assembly technician measures the axial endshaft position relative to the housing, and this value is used to calculate the axial offset of the worm gear required to maintain proper gear mesh position. This measurement allows the assembly technician to select shims from a chart or by operation of a computer program, and these shims are used to offset the position of the worm gear shaft bearing blocks (in FIG. 4, blocks 404 and 410) axially in the direction of the actual mating worm wheel position. In this way, very accurate gear mating can be quickly obtained by an assembly technician without requiring them to have a detailed understanding of the internal mechanical design, complex assembly equipment, or extensive adjust and test requirements.

Upon assembly completion, the axis worm gear set is run in for an extended duration, for example forty-eight hours, in order to ensure good matching of the worm gear set. If the run-in has increased the mesh backlash, the assembly technician adjusts the worm gear shaft bearing blocks to reduce gear center distance and remove the backlash. If required, the gear oil bath can be flushed of break-in particulates and refilled with clean lubricant.

As the pan-tilt device experiences wear in service, the backlash adjustment means in the present invention allows for adjustment of gear mesh interference to reduce induced backlash. In alternative embodiments, changes of the worm gear mesh centerline distance can be effected by the user in the field using the easily accessible front bearing block, and block adjustments can be effected by a screw, cam, shim or other means to effect small changes in bearing block position relative to the housing. In an embodiment, a machined spring (e.g., Heli-Cal PFS250) or similar in function can be added between the worm gear and a support bearing to offer shaft deflection preload on the worm gear mesh. A machined spring or similar feature can be machined into the worm gear shaft to obtain more precise alignment, stronger attachment, lower parts count and cost, and more compact realization.

Dynamic Electrical and Data Connections

Connections from the base connector(s) 116 to the pan housing 106 must be maintained across the rotational pan axis. A slip ring can be used to transfer electrical and other signals across a continuous rotational axis. The embodiment illustrated in FIG. 3 employs a pan slip ring 206. In the present embodiment, the tilt axis rotational electrical circuits utilize moving wires since the tilt axis does not usually require continuous rotation, rotating wires can have lower noise levels and increased reliability, higher circuits counts can be achieved at lower cost, a more compact realization can be achieved, and the cost for implementation can be lower than for commercially available slip rings. The present embodiment encloses the rotating wires into a rolling loop configuration that provides for structured movement for dynamically moving wires. Alternative embodiments can employ slip rings (e.g., axial or pancake rings) on the tilt axis, and conversely, the pan axis can replace a slip ring with dynamically rotating wires.

Figure 5:
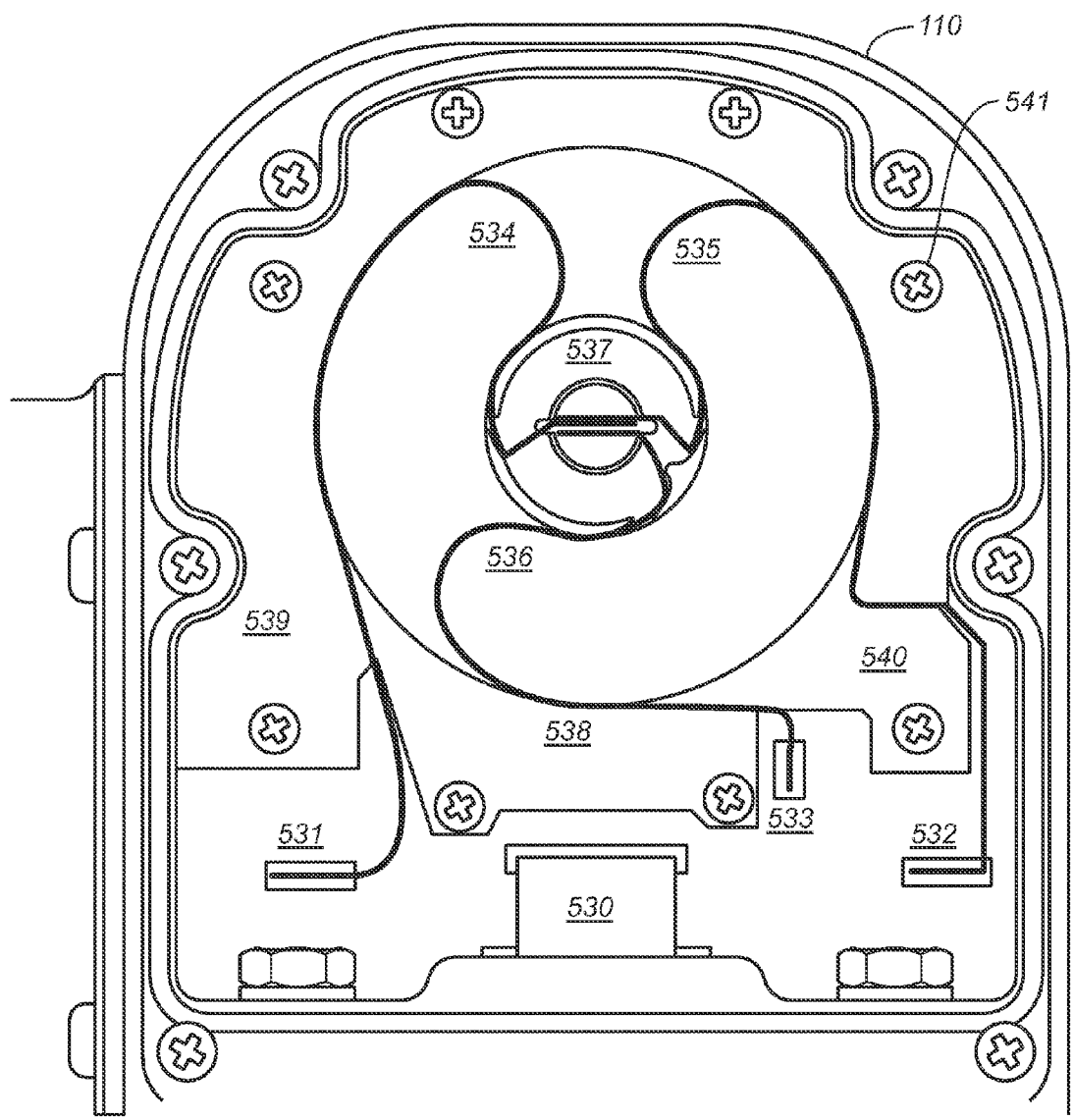
FIG. 5 is a top level view of a rolling twist cap, according to an embodiment.

FIG. 5 shows a top view of an embodiment of a rolling twist capsule for the tilt axis on a pan-tilt mount. Signals from the base connectors 116 and the pan-tilt controller PCB 308 are routed to the tilt PCB 331 via a flat flex connector 530. The signals from the base and controller 530 are routed on the tilt PCB 331 to the pass-through connector, the controller signal connector, and the payload power connector. The payload pass-through signals are carried through a flat flexible cable 534 (e.g., 0.5 mm with nine circuits) that inserts into the pass-through connector 531. Similarly, the pan-tilt controller signals are carried through a flat flexible cable 535 (e.g., 0.5 mm with nine circuits) that inserts into the controller signal connector 532. The payload power and shield signals are carried through a heavier gauge flexible ribbon cable 536 (e.g., 3M series 3319 cable) that terminates to the payload power connector 533 and can carry at least 6 amps continuous. Alternative embodiments can allocate circuits differently and select different flexible circuit components.

The movement of the flexible cables 534, 535, and 536 are guided into a rolling loop configuration within a circular pattern, said cables terminating into a central rotating hub twist cap 537 that guides said cables into the hollow central portion of the rotating tilt shaft 350, and those cables pass though the shaft terminating to the payload connector 132 or other suitable payload connection means. The outermost circular part of the rolling loop configuration is constructed using a bottom bracket 538, main bracket 539, and right bracket 540 (e.g., using laser cut ½" acetal plastic). These brackets 538, 539, 540 are attached by a plurality of screws 541 that connect to the standoffs used to secure the tilt PCB 331. The through holes in the brackets 538, 540 are loose fit in order to allow clamping action of the flex cables 534, 535, 536 between the bracket segments, thereby functioning as cable strain reliefs. The loop lengths 534, 535, 536 are sufficiently long to allow an orderly rolling action of the flex circuits as the central hub twist cap 537 is rotated by the tilt shaft 350, and loop lengths are such as to maintain separation between separate loop cables to reduce crosstalk between said cables. In an alternative embodiment, said flex circuits can be replaced with the wires emanating from the top of the pan slip ring 206, or from other circuit materials and sources.

The number of circuits and flex loops may be increased within the hub 537 by increasing the depth of the hub 537 and the depth of the outer flex brackets 538 539 540. As such, the rolling loop design provides for simple and inexpensive means to increase the gauge and number of electrical connections.

In an alternative embodiment, the twist capsule can be replaced with a slipring. In one embodiment, a pancake slip ring that has a reduced axial profile can be used. Said pancake slipring can be constructed from a series of PCB with circular traces, wherein the dynamic electrical contacts are made with an opposing PCB with matching circular traces, and in which the contact between the traces from adjacent ring channels forms an electrical dynamic contact. In an embodiment, one set of traces can be constructed from a flexible PCB material with an elastic or foam backing in order to maintain good electrical contact with the opposing PCB. Additionally, one or both circular electrical traces can be constructed from a low friction material such as electrically conductive polymer (e.g., as used in some precision potentiometers). In an additional embodiment, one or more electrically resistive traces can be placed on one or more circular rings, so that upon rotation against the opposing ring there occurs a change in resistance such that the position of the rotational axis may be determined with some precision (e.g., a potentiometer laid down on the trace).

Furthermore, the degree of rotation for the rolling twist cap 537 can be designed for at least a rotation of +/−270° while ensuring that the flex loops maintain the proper geometry within the hub 537.

Electronics and Pan-Tilt Controller

FIG. 6 shows a block schematic of the major functional pan-tilt mount controller 650 components and connections. A pan motor driver 651 energizes the pan motor 620 and a tilt motor driver 652 energizes the tilt motor 619. A microcontroller 653 executing a firmware program 654 controls motor drivers 651 652, processes pan 659 and tilt position sensor 660 input, host computer 655 command execution and feedback, and communications with a controller network 656. Input power conditioning 658 filters the input from a DC source 657 and supplies pan motor power $V_p$, tilt motor power $V_t$, and logic power $V_{cc}$.

In the current embodiment, which uses stepping motors as described earlier, a single chip power IC (A3977SED) is used for each axis driver 651 652. These compact drivers incorporate a dual full bridge driver, pulse-width modulation (PWM), current sensing for constant current driving, digital control providing four level current control, voltage reference control of current, internal parasitic diodes and crossover protection, high current and voltage capacity, microstepping, and thermal protection shutdown. PWM is the preferred motor driving technique since it provides for superior motor and driver performance, efficient control of current consumption, and it can accept a wide range of input voltages (e.g., 8-30 VDC) that provides for flexible DC power source 657 selection which allows simpler and more economical installation. Motor current level can be controlled by host computer 655 commands that allow user programs to increase motor power or to conserve mount power consumption (e.g., as in battery-operated applications). An alternative embodiment can use DC servomotors in place of stepping motors. In this case, the microcontroller 653 can implement servocontrol in its firmware program 654 using a single A3977SED power driver chip above-described with the addition of motor shaft position encoder input 659, 660. Alternatively, simpler firmware 654 and improved motor performance may be achieved at higher cost by the use of highly integrated DC servomotor control chips as replacement PWM drivers 651 652 (e.g., Performance Motion Devices motion processor MC2400).

In the present embodiment, an MC68HC11-based microcontroller was used. The firmware program 654 digitally controls the motor drivers 651 652, performs mount initialization and homing, processes host computer 655 commands and feedback via an RS-232 port, and capability is provided for command and feedback via an RS-485 multi-drop controller network 656. When input DC power 657 is applied, the program 654 performs a system reset by initializing internal data structures, verifying mount defaults stored in its EEPROM, commanding the motors to move until the limit positions are identified, and moving the mount to its home position. The program 654 processes commands from and returns status to the host computer 655 or controller network 656 for mount position, speed, acceleration, upper allowable speed limit, starting motor velocity, unit reset, positional resolution, position limits, and mount parameter defaults read from non-volatile memory upon power up. In addition, commands and queries are provided to allow the control of motor power mode when in-transit and stationary. These modes include high power mode (energized windings at rated current), regular power mode (at rated motor power levels), low power mode (windings use 33% of the current used in regular power mode), and when stationary a motor power off mode is provided. Executed position and speed commands override previous position and speed commands that may not have yet completed (i.e., on-the-fly position and speed changes are provided), and an await completion command is provided to allow executing position and speed commands to complete before new commands are processed. In addition, two command execution modes are provided. In immediate mode, position and speed commands are executed immediately. In slaved mode, position and speed are executed upon an await completion command in order to allow simultaneous commencement of pan and tilt axis command execution.

In interactive command mode, pan-tilt mount commands are specified by ASCII strings that are well suited for interactive user control from a terminal. Alternatively, a binary command mode is provided to provide a more compact command format that a program executing on the host computer can use to achieve significant improvements in host/controller communications bandwidth. For example, binary mode commands typically use less than one third the number of bytes required by the interactive ASCII mode, so a tripling of bandwidth can be obtained (e.g., binary mode on a 9600 baud RS-232 link can achieve command transfer rates that an interactive ASCII mode would require over 28.8 K baud to achieve).

The program 654 performs interrupt-driven control of motor drivers 651, 652 to precisely control pan 620 and tilt 619 motor acceleration, deceleration, velocity, and current levels. As described earlier, the current embodiment uses stepping motors. Each motor has an associated software routine that is activated by an interrupt generated by the microcontroller 653 parallel timing circuitry, and this routine controls its associated motor driver 651, 652 to affect motor winding polarity and current, updates motor state variables, and schedules the time at which the next interrupt should again activate the routine. These motor routines run at a higher priority than the main program which processes host commands and queries in order to achieve precise motor speed control that is independent of host communications traffic. Linear acceleration was used since it has low computational requirements (a precomputed table may be indexed to determine step time intervals). Preferred embodiments can use more computationally intensive acceleration methods that may provide better dynamic performance (e.g., S-curve acceleration).

In an embodiment, slow speeds use the highest microstepping resolution (e.g., $\frac{1}{8}^{th}$ step for the A3977SED motor driver). As motor rotational speed increases, the firmware program 654 automatically determines when lower resolution step modes (e.g., full step, half step and quarter step) may be used to decrease microcontroller interrupt rates, improve motor smoothness at higher speeds using the step mode best for that speed, and achieve higher rotational rates afforded by lower resolution step angles. The current embodiment, and alternative embodiments described earlier, may use alternative motor controls as are customary and applied.

After the electronics are installed and power up tested, the overall device covers are installed to protect the device internals from ingress of contaminants. In an embodiment in FIGS. 1-5, the pan and tilt housings form the main device housing that is exposed to the environment, and covers are added to close and seal openings in the housings which include the tilt housing cover 120, pan housing cover 118, motor cover 108, and front bearing block covers 134 135. In an alternative embodiment, the pan and tilt housings are mechanical housings, but an additional external sealing shell cover is installed, in which the external shell cover includes seals against all externally accessible output axes to prevent against ingress of environmental contaminants.

The following are some exemplary parameters showing pan-tilt performance and materials for the current D300 embodiment.

Maximum payload: 35 pounds over the top, 70 pounds over the side

Maximum velocity: over 50°/second

Resolution: 0.0257° in half step mode, 0.0064° in $\frac{1}{8}^{th}$ step resolution Tilt range: greater than 100°

Pan range: continuous with pan slip ring

Mount dimensions: 5.3" (width)×11.6" (height)×8.5" (depth)

Pan and tilt motor, Oriental Motor, PV267-02AA 1.8°; 300 oz/in, hybrid 2-phase stepping motor Worm gear reduction: 35:1

Motor driver: Allegro Microsystems, A3977SED

Dual full H-bridge, PWM constant current bipolar drive

Input Voltage: 9-30 VDC unregulated

Power Consumption:

High-power mode: 49.2 W continuous peak

Regular-power mode: 34.2 W continuous peak

Low-power mode: 18.2 W continuous peak

Holding power off mode: less than 1.6 W

The following are some exemplary host computer 655 commands executed by the firmware program 654 to control pan-tilt mount operation. <axis> is the character "T" for the tilt axis or the character "P" for the pan axis.

Pan-tilt mount axis commands:
General form: <axis><command><value><delim> → [<status>]
Go to position: <axis>P<position><delim>→ [<status>]
Go to offset position: <axis>O<relative position><delim> → <[status>]
Set desired speed: <axis>S<positions/sec><delim> → [<status>]
Set acceleration: <axis>A<positions/sec2><delim>[<status>]
Set speed bounds: <axis>[<upper><lower>]<positions/sec><delim>→ <[status>]
Move power mode:
<axis>M[<hi power><reg power><<low power>]<delim>→ [<status>]
Hold (stationery) power mode:
<axis>H [<reg power><low power><power off>]<delim> → [<status>]
Queries:
General form: <axis><command><delim>→ <query answer>
Axis Control Commands become queries when the <value>argument is omitted.
Resolution: <axis>R<delim>→ <arc seconds per position>
Position bounds: <axis>[<min><max>]<delim> → <boundary position>
Unit Commands:
Command menu: ?<delim>→ <menu>
Await completion: A<delim>→ <status>
Reset unit: R<delim>→ [<status>]
Immediate mode: I<delim>→ <[status>]
Slaved mode: S<delim>→ [<status>]
Defaults used at power up (saved in EEPROM):
D[<save current settings><restore prior settings><restore factory settings>]<delim>→ <[status>]

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A device comprising:
a housing;
a first assembly including a first worm shaft and a first worm wheel, wherein the first worm shaft is coupled to the housing through bearings and first and second independently adjustable bearing supports attached to corresponding first and second recesses in first opposing sides of the housing;
a tilt motor mounted external to one of the first opposing sides of the housing, the tilt motor having a tilt motor shaft received by a first end of the first worm shaft;
a tilt shaft coupled to the first worm wheel, the tilt shaft supported by tilt shaft bearings directly received by the housing;
a second assembly including a second worm shaft and a second worm wheel, wherein the second worm shaft is coupled to the housing through bearings and third and fourth independently adjustable bearing supports attached to corresponding third and fourth recesses in second opposing sides of the housing;
a pan motor mounted external to the one of the second opposing sides of the housing, the pan motor having a pan motor shaft received by a first end of the second worm shaft;
a pan shaft coupled to the second worm wheel, the pan shaft supported by pan shaft bearings directly received by the housing; and
a base receiving the pan shaft such that rotation of the pan shaft by the second worm wheel rotates the housing with respect to the base, wherein each bearing support comprises an adjustment mechanism configured to adjust a location of the bearing support within a corresponding recess to provide independent cross axial position adjustment in two dimensions of one end of the first or second worm shaft, wherein the adjustment mechanism comprises a plurality of screws threaded into the housing in the corresponding recess and a corresponding plurality of through holes in each bearing wherein diameters of the plurality of through holes are larger than corresponding diameters of threaded shafts of the plurality of screws to allow two dimensions of adjustment of each bearing support location relative to the corresponding recess in the housing to provide for finely adjusting positions of the first and second worm shafts within the device.

2. The device of claim 1, wherein the housing comprises a first housing rigidly coupled to a second housing.

3. The device of claim 2, wherein the first assembly is located within the first housing and the second assembly is located within the second housing.

4. The device of claim 1, including a first seal chamber located within the housing and a second seal chamber located within the housing.

5. The device of claim 4, wherein:
the first worm wheel is within the first seal chamber and the second worm wheel is within the second seal chamber; and
a payload is coupled to the tilt shaft through a payload hub or a payload bracket, wherein the payload comprises a thermal or visible camera, a spotlight, a laser, an antenna, a sensor, an output device, or weighs more than ten pounds.

6. The device of claim 5, wherein the first and second seal chambers include a first and second oil bath therein, and wherein at least one bearing coupled to the first or second worm shaft is immersed in the first or second oil bath.

7. The device of claim 1, wherein the first worm wheel is isolated from the second worm wheel.

8. The device of claim 1, wherein one of the first and second adjustable bearing supports includes a first hub having exterior threads such that the first hub is configured to be screwed into a corresponding bearing support to axially preload the bearings coupled to the first worm shaft.

9. The device of claim 1 wherein the tilt shaft is a hollow tilt shaft.

10. The device of claim 1, wherein one of the third and fourth adjustable bearing supports includes a second hub having exterior threads such that the second hub can be configured to be screwed into its a corresponding bearing support to axially preload the bearings coupled to the second worm shaft.

11. The device of claim 1, wherein the pan shaft is a hollow pan shaft.

12. The device of claim 1 including a slip ring located in the base, the slip ring includes a set of electrical wires configured to extend through the second assembly.

13. The device of claim 1, wherein the first opposing sides of the housing are the same as the second opposing sides of the housing.

14. A method of using the device of claim 1, comprising:
controlling the tilt motor or the pan motor according to a motor power mode or a command execution mode to initialize, home, or move the device according to a provided position, speed, acceleration, upper allowable speed limit, starting motor velocity, unit reset, positional resolution, position limits, or one or more parameter defaults.

15. A pan/tilt tracking mount system, comprising:
a housing;
a tilt assembly, located within the housing, comprising a tilt worm shaft, a tilt worm wheel, and a hollow tilt shaft fitted within a core of the tilt worm wheel, the tilt worm shaft having opposing ends coupled to the housing through bearings and first and second independently adjustable bearing supports attached to corresponding first and second recesses in first opposing sides of the housing, the hollow tilt shaft supported by tilt shaft bearings directly received by the housing;
a tilt motor mounted external to one of the first opposing sides of the housing, the tilt motor having a tilt motor shaft received by an end of the tilt worm shaft;
a first seal chamber containing the tilt worm wheel, and a first oil bath within the first seal chamber wherein the first oil bath lubricates the tilt worm wheel or one of the bearings coupled to the tilt worm shaft;
a pan assembly, located within housing, comprising a pan worm shaft, a pan worm wheel, and a hollow pan shaft fitted within a core of the pan worm wheel, the pan worm shaft having opposing ends coupled to the housing through bearings and third and fourth independently adjustable bearing supports attached to corresponding first and second recesses in second opposing sides of the housing, the hollow pan shaft supported by pan shaft bearings directly received by the housing;
a pan motor mounted external to one of the second opposing sides of the housing, the pan motor having a pan motor shaft received by the first end of the pan worm shaft;
a second seal chamber containing the pan worm wheel, and a second oil bath within the second seal chamber wherein the second oil bath lubricates the second worm wheel or one of the bearings coupled to the pan worm shaft;
a pedestal coupled to the hollow pan shaft such that rotation of the hollow pan shaft by the pan worm wheel rotates the housing with respect to the pedestal; and
a base coupled to the pedestal, the base mounting the pan tilt tracking mount system to a surface, wherein each bearing support comprises an adjustment mechanism configured to adjust a location of the bearing support within a corresponding recess to provide independent cross axial position adjustment in two dimensions of one end of the first or second worm shaft, wherein the adjustment mechanism comprises a plurality of screws threaded into the housing in the corresponding recess and a corresponding plurality of through holes in each bearing support, wherein diameters of the plurality of through holes are larger than corresponding diameters of threaded shafts of the plurality of screws to allow two dimensions of adjustment of each bearing support location relative to the corresponding recess in the housing to provide for finely adjusting positions of the first and second worm shafts within the pan/tilt tracking mount system.

16. The pan/tilt tracking mount system of claim 15, which includes a slip ring located at the base of the pedestal, wherein the slip ring includes a first set of electrical wires configured to extend through the hollow pan shaft.

17. The pan/tilt tracking mount system of claim 15, wherein the pan shaft bearings comprise a first set of bearings, and wherein the first set of bearings are coupled to a first set of hubs having exterior threads such that the hub can be screwed to axially preload the first set of bearings.

18. The pan/tilt tracking mount system of claim 17, wherein the pan shaft bearings further comprise a second set of bearings, wherein the second set of bearings are coupled to a second set of hubs having exterior threads such that the hub is configured to be screwed to axially preload the second set of bearings.

19. The pan/tilt tracking mount system of claim 15, further comprising a payload hub coupled to the hollow tilt shaft.

20. The pan/tilt tracking mount system of claim 19, wherein when the hollow tilt shaft rotates, the payload hub also rotates at an equivalent degree of the tilt shaft.

21. The pan/tilt tracking mount system of claim 19, wherein:
a payload bracket is coupled to the payload hub; and
a payload is coupled to the payload bracket, wherein the payload comprises a thermal or visible camera, a spotlight, a laser, an antenna, a sensor, an output device, or weighs more than ten pounds.

22. The pan/tilt tracking mount system of claim 15, further comprising a grease seal at an interface between the base and the housing.

23. The pan-tilt tracking mount system of claim 22, further comprising a tapered rolling bearing enclosed within the grease seal.

24. The pan-tilt tracking mount system of claim 15, further comprising an oil seal disposed against the housing.

25. The pan-tilt tracking mount system of claim 24, wherein the oil seal includes a spring-loaded seal.

26. The pan-tilt tracking mount system of claim 15, wherein the first opposing sides of the housing are the same as the second opposing sides of the housing.

27. A method of using the pan-tilt tracking mount system of claim 15, comprising: controlling the tilt motor or the pan motor according to a motor power mode or a command execution mode to initialize, home, or move the pan-tilt tracking mount system according to a provided position, speed, acceleration, upper allowable speed limit, starting motor velocity, unit reset, positional resolution, position limits, or one or more parameter defaults.

* * * * *